C. C. HINKLEY.
DIFFERENTIAL GEARING.
APPLICATION FILED OCT. 25, 1913.
1,115,536.
Patented Nov. 3, 1914.
2 SHEETS—SHEET 1.
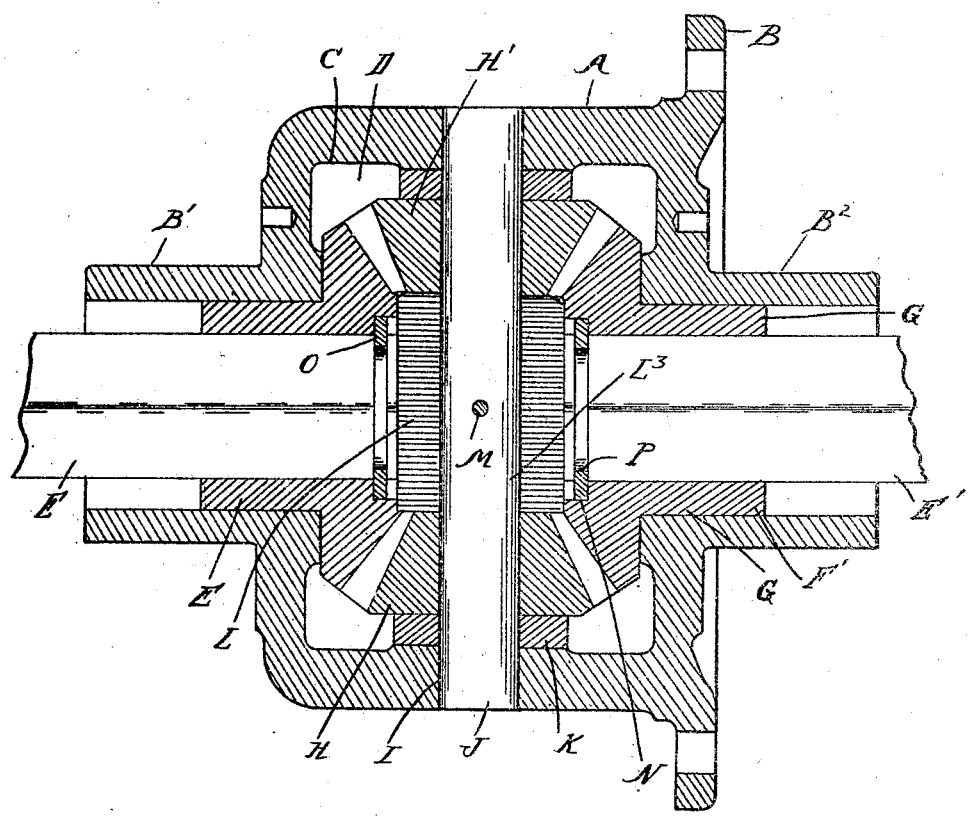
Witnesses
W. K. Ford
James P. Barry
Inventor
Carl C. Hinkley
By Whittemore Hulbert & Whittemore
Attys, C. C. HINKLEY.
DIFFERENTIAL GEARING.
APPLICATION FILED OCT. 25, 1913.
1,115,536.
Patented Nov. 3, 1914.
2 SHEETS—SHEET 2.
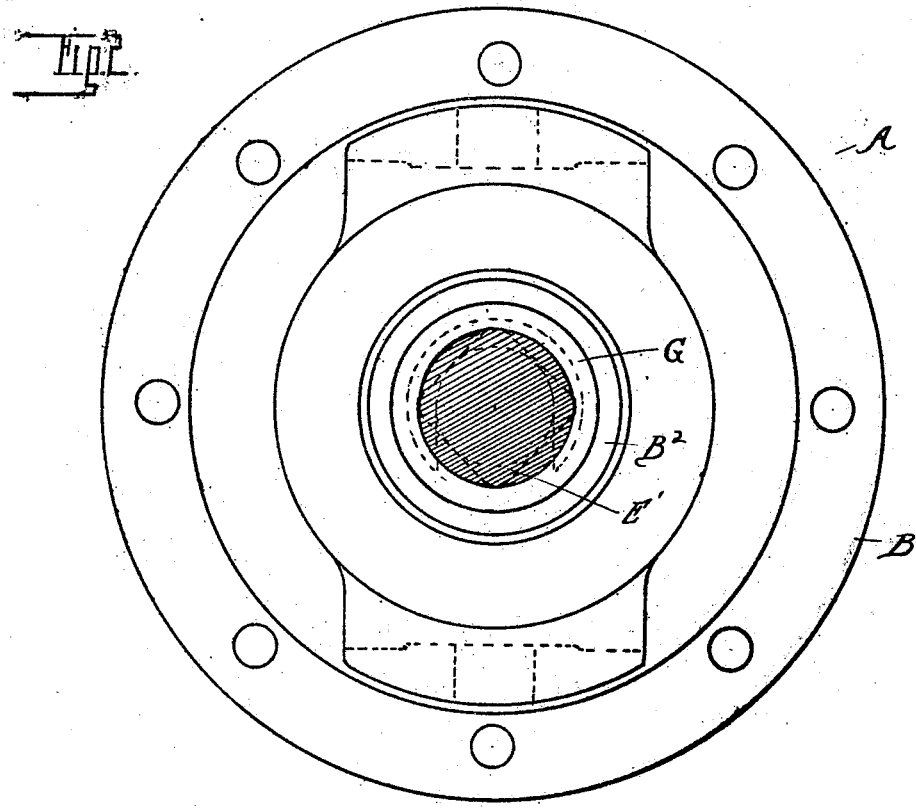
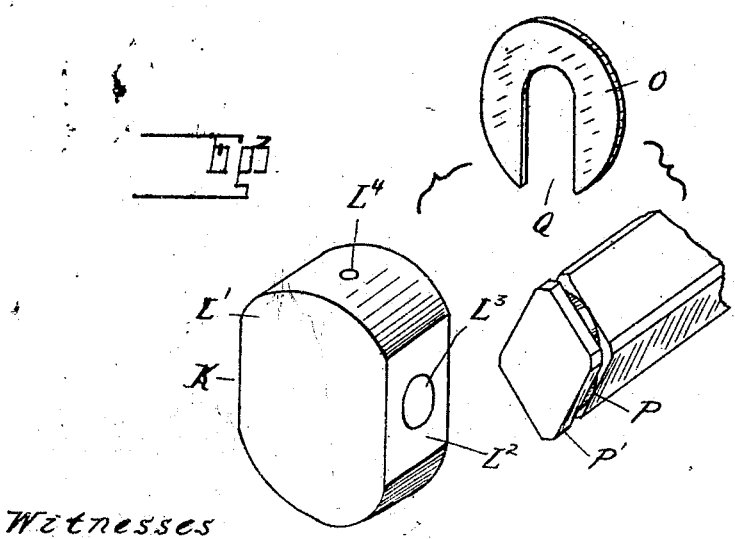
Witnesses
W. K. Frad
James P. Barry
Inventor
Carl C. Hinkley
By Whittemore Hulbert + Whittemore
Att'ys

UNITED STATES PATENT OFFICE.

CARL C. HINKLEY, OF DETROIT, MICHIGAN, ASSIGNOR TO SAXON MOTOR CAR COMPANY, OF DETROIT, MICHIGAN, A CORPORATION OF MICHIGAN.

DIFFERENTIAL GEARING.

1,115,536.     Specification of Letters Patent.     Patented Nov. 3, 1914.

Application filed October 25, 1913. Serial No. 797,188.

*To all whom it may concern:*

Be it known that I, CARL C. HINKLEY, a citizen of the United States of America, residing at Detroit, in the county of Wayne and State of Michigan, have invented certain new and useful Improvements in Differential Gearing, of which the following is a specification, reference being had therein to the accompanying drawings.

The invention relates to differential gearing designed for use in motor vehicle drive axle construction.

It is the object of the invention to obtain a construction which may be easily assembled or disassembled while within the axle housing through a relatively small opening in said housing.

It is a further object to provide means for taking the end thrust upon the drive axle sections in both directions within the differential mechanism, and at the same time to permit of readily disengaging said sections when desired.

Still another object is to simplify and cheapen the construction of parts while maintaining all the advantages of more complex structures.

With these objects in view the invention comprises various features of construction as hereinafter set forth.

In the drawings: Figure 1 is a longitudinal section through the differential gearing; Fig. 2 is an end elevation thereof; and Fig. 3 is a perspective view of some of the parts detached.

A is the drive member of the differential mechanism which is provided with a flange B for attachment of the bevel gear wheel or other driving means (not shown). B and B' are hub sections at opposite ends of the member A, and C is the yoke connecting said hub sections and providing a rectangular space D therebetween, open upon opposite sides. All of these parts are preferably formed integral, and the several sides which bound the central space D are faced to be respectively parallel, and perpendicular with each other and also with the axis of the hubs B and B'.

E and E' are the axle drive shaft connections which extend inward through the hubs B and B' and are connected respectively with bevel gear wheels F and F'. These bevel gear wheels fit upon squared or polygonal portions of the shaft sections E and E' and are provided with hub or sleeve portions G which are journaled in the hubs B and B'. The length of these sleeves G is, however, limited so as to permit of the insertion of the same from the space D within the yoke C. H and H' are bevel pinions intermeshing with the bevel gear wheels F and F', and also arranged in the space D within the yoke C. To engage these pinions H H' with the gear wheels a sufficient clearance is provided between the same and the inner faces of the yoke C, to permit of rolling the pinions into position where the outer face of each is parallel to the inner face of the yoke. The yoke is also formed with a bore I perpendicular to its inner face, and in the plane of the axis of the hubs B and B', which bore permits of the insertion of a shaft or pin J, on which the bevel pinions H H' are journaled. Spacing washers K are arranged between the pinions and the adjacent inner faces of the yoke, being also sleeved upon the pin J and serving to take thrust and limit the outward movement of said pinions.

To limit the movement of the gears and pinions in an inward direction a filler block L is placed in the space between said pinions. This block, as shown in Fig. 3, is preferably formed by a cylindrical member having parallel opposite end faces L', and having flattened opposite sides $L^2$ perpendicular to said faces. $L^3$ is a bore perpendicular to the faces $L^2$ and fitting the pin J. $L^4$ is a bore perpendicular to the bore $L^3$ and registering with a corresponding bore in the pin J, for the insertion of a cotter-pin for holding the parts when assembled from displacement. Thus the block L will hold the gear wheels and pinions from inward movement, while the cotter-pin connection M between said block and pin J will hold the latter from endwise movement in the yoke C.

A further feature of my invention is the provision of an end thrust bearing for the shaft sections E and E'. This is formed by providing a counter-bore or recess N in each of the pinions F F' adapted to receive a circular key or washer O. The latter is engaged with the shaft section E by grooving said section at P adjacent to its inner end and forming an entering slot Q in the washer which will permit of its engagement with said groove, and adjustment into a position concentric with the axis of the shaft. The combined thickness of the washer O and the portion P' of the shaft outside of the groove P corresponds with the depth of the recess N in the gear wheel G, so that when the parts are assembled the end of the shaft is flush with the inner face of the pinion.

With the parts constructed as described, to assemble them the member A is placed in position within the axle housing, with the gear wheels F and F' in engagement with the hubs B and B'. The shaft sections E and E' may then be inserted from the opposite ends of said hubs into engagement with the sleeve G of the gear wheels F and F', and by projecting the ends of said shaft inward beyond the ends of the pinion, the washers O may be inserted in the grooves P, after which the shafts may be drawn back to engage said washers with the recesses N. The pinions H and H' may then be placed in mesh with the gear wheels F and F', and rolled into a position of axial alinement with the bore I in the yoke. The washers K and the spacing block L are then placed in position of axial alinement, after which the pin J is inserted through the alined members, and the yoke being finally locked by the insertion of the cross pin or cotter M. This will complete the assembly, and it will be noted that the gear wheels and pinions are held in proper relative position, while the shaft sections E and E' are held from longitudinal movement in either direction.

What I claim as my invention is:

1. In a differential gearing, the combination with a yoke frame having alined hubs at opposite ends thereof, gear wheels journaled in said hubs insertible therein from within the yoke, a pinion intermeshing with said gear wheels within the yoke, a shaft extending across said yoke upon which the pinion is journaled, and a block sleeved upon the shaft and directly engaging the gear wheels, said block forming a spacer between the gear wheels and a direct bearing therefor.

2. In a differential gearing, the combination of a yoke frame having alined tubular hubs at opposite ends thereof, gear wheels provided with tubular sleeves journaled in said hubs and insertible therein from the space within the yoke, a pinion intermeshing with said gear wheels, a shaft on which said pinion is journaled, said shaft being insertible transversely through the yoke into engagement therewith, shafts engaging the sleeves of the gear wheels, a block sleeved upon said first mentioned shaft and directly engaging the said gear wheels, and the end of the gear wheel shafts said block forming a spacer between the gear wheels and a direct bearing therefor and the gear wheel shafts.

3. In a differential gearing, the combination with a yoke frame, having alined hubs at opposite ends thereof, gear wheels journaled in said hubs, a pinion intermeshing with said gear wheels within the yoke, a shaft extending across the yoke upon which said pinion is journaled, shafts fitting within the gear wheels with their inner ends substantially flush with the inner end faces of said gear wheels, a block sleeved upon the first mentioned shaft and fitting directly against the inner end faces of the gear wheels, said block forming a spacer between the gear wheels and a direct bearing therefor, and also end thrust bearings for the said gear wheel shafts.

4. In a differential gearing, the combination with a yoke frame having alined tubular hubs at opposite ends thereof, gear wheels provided with tubular sleeves journaled in said hubs and insertible therein from the space within the yoke, a pinion intermeshing with said gear wheels, said gear wheels being provided with recesses in their inner end faces, a shaft upon which said pinion is journaled extending across the yoke, shafts engaging the sleeves of the gear wheels with their inner ends extending substantially flush with the inner end faces of the gear wheels, collars laterally engageable with the ends of said last mentioned shafts through the space within the yoke and fitting within the recesses in the gear wheels, a block sleeved upon the first mentioned shaft and directly fitting against the inner end faces of the gear wheels, and the inner ends of the gear wheel shafts, said block forming a spacer between the gear wheels and a direct bearing for the gear wheels and for the gear wheel shafts.

5. In a differential gearing, a yoke frame having a tubular hub, a gear wheel provided with a tubular sleeve journaled in said hub and insertible therein from the space within said yoke, a shaft longitudinally engageable with said gear wheel and sleeve, a collar laterally engageable with said shaft from within said yoke, a pinion intermeshing with said gear wheel within said yoke, a shaft insertible transversely through said yoke and pinion and forming a journal for the latter, and a block sleeved upon said shaft forming an end thrust bearing for said first-mentioned shaft and holding the collar thereon in engagement with said gear wheel.

6. In a differential gearing, the combination with a yoke frame having alined tubular hubs at opposite ends thereof, of gear wheels provided with tubular sleeves journaled in said hubs and insertible therein from the space within said yoke, said gear wheels being provided with circular recesses in their inner end faces, shafts having polygonal portions longitudinally engageable with said sleeves, collars laterally engageable with the ends of said shafts through the space within said yoke and fitting within the circular recesses in said gear wheels, a pinion intermeshing with said gear wheels, an apertured block intermediate the ends of said shafts and adjacent to said pinion, and a shaft insertible transversely through said yoke, pinion and apertured block.

7. In a differential gearing, the combination with a yoke frame having alined tubular hubs at opposite ends thereof, of gear wheels provided with sleeves journaled in said hubs and insertible therein from the space within said yoke, shafts having polygonal portions engageable with said gear wheels and sleeves, slotted disks or collars laterally engageable with circumferential grooves in the ends of said shafts and adjustable into concentric relation therewith, said disks being engageable with circular recesses in said gear wheels by a longitudinal adjustment of said shafts, a pinion intermeshing with said gear wheels, an apertured block forming a spacer between the ends of said shafts and adjacent to said pinion, and a shaft insertible transversely through said yoke, pinion and apertured block.

8. In a differential gearing, the combination with a yoke frame having alined tubular hubs at opposite ends thereof, with parallel inner faces and the sides of said yoke having parallel inner faces perpendicular to the faces on said hub, gear wheels having tubular hubs or sleeves journaled in said hubs and insertible therein from the space within said yoke, pinions intermeshing with said gear wheels revoluble therewith into parallelism with the faces on the sides of said yoke, spacer washers between said pinions and the inner faces of said yoke, an apertured block intermediate said gear wheels and pinions, said block directly engaging the inner end faces of the gear wheels and pinions and forming a spacer between the gear wheels and pinions and a direct bearing therefor, and a shaft insertible transversely through said yoke and the alined spacer washers, spacer block and pinions to hold said parts in assembled relation and to form journals for said pinions.

In testimony whereof I affix my signature in presence of two witnesses.

CARL C. HINKLEY.

Witnesses:
D. J. HUGHE,
D. BAYNE.